(12) United States Patent
Kim et al.

(10) Patent No.: US 8,216,716 B2
(45) Date of Patent: Jul. 10, 2012

(54) LITHIUM RECHARGEABLE BATTERY HAVING AN INTERNAL SPACE

(75) Inventors: Chang Seob Kim, Cheonan-si (KR); Young Bae Sohn, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 12/816,690

(22) Filed: Jun. 16, 2010

(65) Prior Publication Data

US 2010/0248013 A1    Sep. 30, 2010

Related U.S. Application Data

(63) Continuation of application No. 11/239,080, filed on Sep. 30, 2005.

(30) Foreign Application Priority Data

Oct. 1, 2004  (KR) .......................... 10-2004-0078187

(51) Int. Cl.
*H01M 2/00* (2006.01)
*H01M 2/02* (2006.01)

(52) U.S. Cl. .......................... 429/163; 429/164; 429/186

(58) Field of Classification Search .......................... None
See application file for complete search history.

(56) References Cited

U.S. PATENT DOCUMENTS

| 6,040,082 A | 3/2000 | Haas et al. |
| 2006/0057433 A1 | 3/2006 | Ando et al. |

FOREIGN PATENT DOCUMENTS

| JP | 2003-151507 | 5/2003 |
| KR | 10-2000-0051638 | 8/2000 |

OTHER PUBLICATIONS

Machine translation of JP 2003-151507, Kaneda et al., Sep. 11, 2001.*
Non-Final Office Action issued Jul. 29, 2008 in U.S. Appl. No. 11/239,080.
Final Office Action issued Jan. 26, 2009 in U.S. Appl. No. 11/239,080.
Non-Final Office Action issued May 15, 2009 in U.S. Appl. No. 11/239,080.
Final Office Action issued Nov. 13, 2009 in U.S. Appl. No. 11/239,080.

* cited by examiner

*Primary Examiner* — Barbara Gilliam
*Assistant Examiner* — Kwang Han
(74) *Attorney, Agent, or Firm* — H.C. Park & Associates, PLC

(57) ABSTRACT

A lithium rechargeable battery includes an electrode assembly having a first electrode, a second electrode, and a separator interposed between them, a can having an opening to contain the electrode assembly, and a cap plate coupled to the top of the can. A side of the can is asymmetrical with respect to another side thereof about at least one of a long axis, short axis, and central point of its cross section. The lithium rechargeable battery has a predetermined space formed between the can and the electrode assembly for improved electrolyte injection and increased manufacturing efficiency and power storage capacity of the battery.

10 Claims, 6 Drawing Sheets

LITHIUM RECHARGEABLE BATTERY HAVING AN INTERNAL SPACE

CROSS REFERENCE TO RELATED APPLICATIONS

This application is a continuation of U.S. patent application Ser. No. 11/239,080, filed Sep. 30, 2005 and claims priority to and the benefit of Korean Patent Application No. 10-2004-0078187, filed on Oct. 1, 2004, which are both hereby incorporated by reference for all purposes as if fully set forth herein.

BACKGROUND OF THE INVENTION

1. Field of the Invention

The present invention relates to a lithium rechargeable battery that has an internal space formed between a can and an electrode assembly to improve electrolyte injection.

2. Description of the Prior Art

In general, a rechargeable battery may be charged and discharged, in contrast to a nonrechargeable battery which is not rechargeable, and can be made in a compact size with a large power storage capacity. Typical examples of rechargeable batteries include nickel metal hydrogen (Ni-MH) batteries, lithium (Li) batteries, and lithium ion batteries. Recently developed lithium rechargeable batteries are widely used in cutting-edge electronic devices such as cellular phones and laptop computers.

Rechargeable lithium batteries are classified into lithium ion batteries that use a liquid electrolyte and lithium polymer batteries that use a polymer electrolyte. Rechargeable batteries may also be classified into cylindrical batteries that use a cylindrical aluminum can, rectangular box batteries that use a rectangular box-shaped aluminum can, and pouch-type batteries that are contained in a plate-shaped pouch case.

A rechargeable battery generally comprises a can, an electrode assembly contained in the can, and a cap assembly that is coupled to the top opening of the can. The electrode assembly is formed by winding a first electrode and a second electrode together with a separator interposed between them into a jelly roll. The electrode assembly is placed into the can, the top opening of which is then sealed by the cap assembly.

FIG. 1 is a top view of a conventional rectangular box type rechargeable battery with angled corners and FIG. 2 is a top view of a rectangular box type rechargeable battery with rounded corners.

Referring to FIG. 1, a can 10 generally has angled corners, a rectangular box-shaped space, and an electrode assembly 12 contained therein. However, the corners of the rectangular box type rechargeable battery shown in FIG. 1 are angled and do not accurately correspond to the corners of the electrode assembly 12, which are rounded. As a result, the can 10 has an unnecessary void that is not occupied by the electrode assembly 12. This makes it difficult to maximize the battery capacity and degrades the aesthetic appearance. In order to solve this problem, a rectangular box type rechargeable battery that has a can 20 with rounded or curved corners as shown in FIG. 2 have recently been used.

Referring to FIG. 2, the can 20 generally has curved corners, a rectangular box-shaped space, and an electrode assembly 22 contained therein together with an electrolyte (not shown). The curved corners of the can 20 accurately correspond to the curved portions of the jelly roll-shaped electrode assembly 22. As a result, unnecessary space is not created in the sides of the can 20.

However, since there is no space between the electrode assembly 22 and the can 20 in the rechargeable battery with curved corners as shown in FIG. 2, it takes a long time to inject an electrolyte and the productivity of the battery deteriorates. Furthermore, the lack of space between the can 20 and the electrode assembly 22 makes it difficult to uniformly inject the electrolyte into the electrode assembly 22. This decreases the battery's power storage capacity.

SUMMARY OF THE INVENTION

The present invention provides a lithium rechargeable battery that has an internal space formed between a can and an electrode assembly for improved electrolyte injection.

Additional features of the invention will be set forth in the description which follows, and in part will be apparent from the description, or may be learned by practice of the invention.

The present invention discloses a lithium rechargeable battery comprising an electrode assembly including a first electrode, a second electrode, and a separator interposed between them. The battery further comprises a can having an opening to hold the electrode assembly and a cap plate that is coupled with the top of the can, wherein a side of the can is asymmetrical to the other side thereof about at least one of the long axis, short axis, and central point of the cross section thereof.

The present invention also discloses a lithium rechargeable battery comprising an electrode assembly including a first electrode, a second electrode, and a separator interposed between them. The battery further comprises a can having an opening to hold the electrode assembly and a cap plate that is coupled with the top of the can, wherein a side of the electrode assembly is asymmetrical to the other side thereof about at least one of the long axis, short axis, and central point of the cross section thereof.

The present invention also discloses a lithium rechargeable battery comprising an electrode assembly including a first electrode, a second electrode, and a separator interposed between them. The battery further comprises a can having an opening to hold the electrode assembly and a cap plate that is coupled with the top of the can, wherein the spacing between the can and the outer periphery of the electrode assembly on the cross section of the can and the electrode assembly varies about at least one of the long axis, short axis, and central point of the cross section.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the is principles of the invention.

DETAILED DESCRIPTION OF THE ILLUSTRATED EMBODIMENTS

The lithium rechargeable battery of the present invention has a predetermined space formed between the can and the electrode assembly for improved electrolyte injection, manufacturing efficiency, and power storage capacity of the battery. This avoids a drop in productivity caused by prolonged electrolyte injection time. Furthermore, a sufficient amount of the electrolyte is easily injected through the space formed between the can and the electrode assembly and is distributed between the electrodes in a uniform manner.

Figure 1:
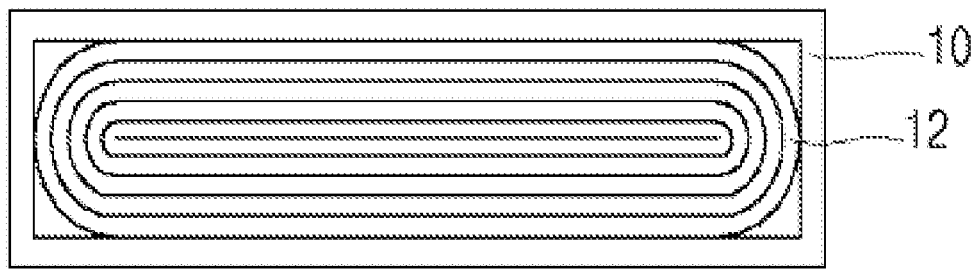
FIG. 1 is a top view of a conventional rectangular box-type rechargeable battery with angled corners.
Figure 2:
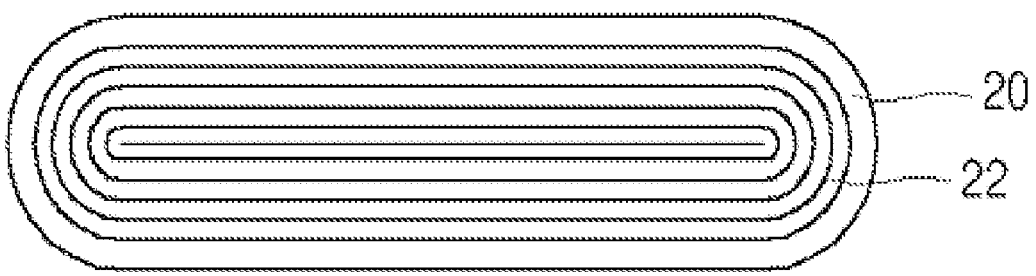
FIG. 2 is a top view of a conventional rectangular box-type rechargeable battery with rounded corners.
Figure 3:
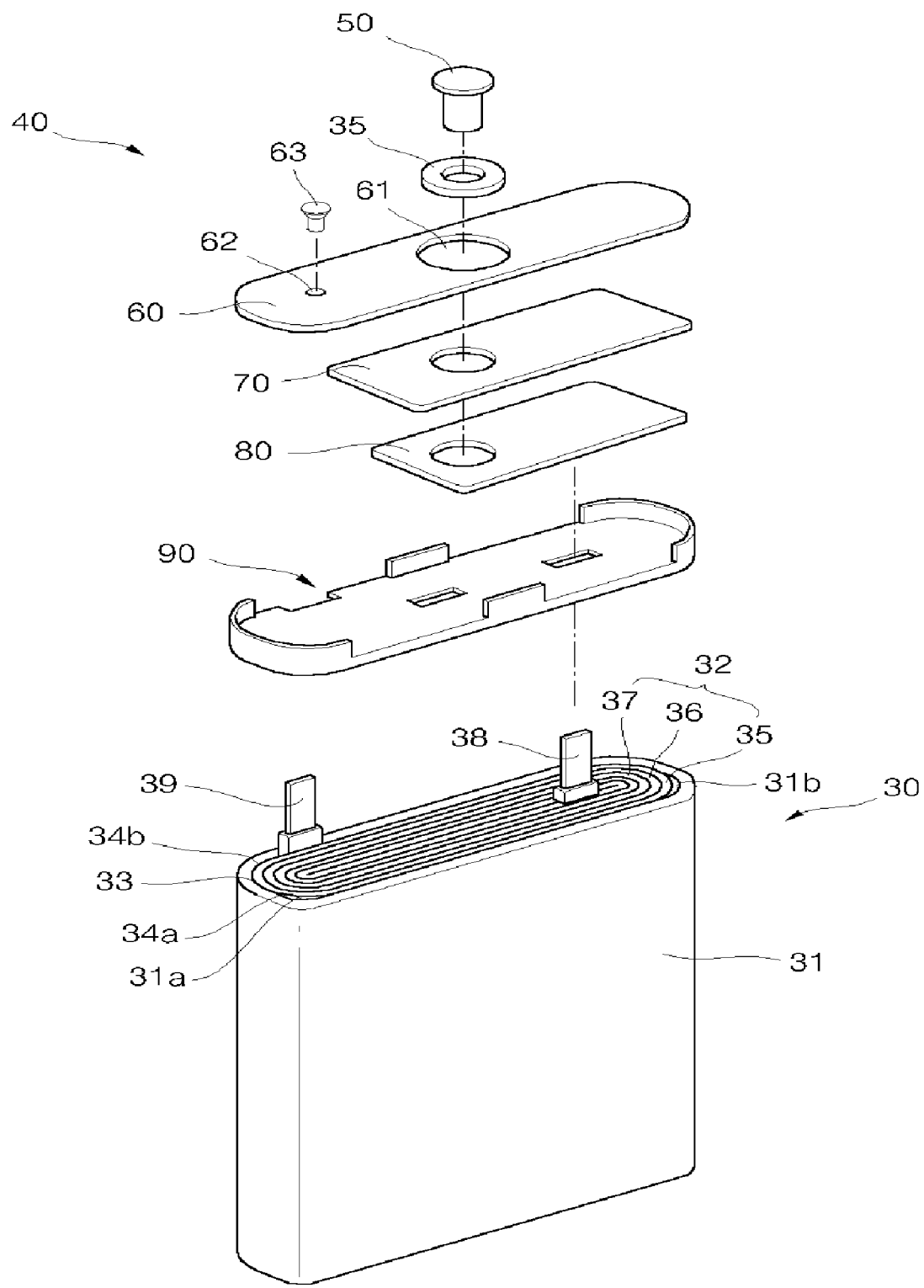
FIG. 3 is an exploded perspective view of a lithium rechargeable battery according to a first embodiment of the present invention.
Figure 4:
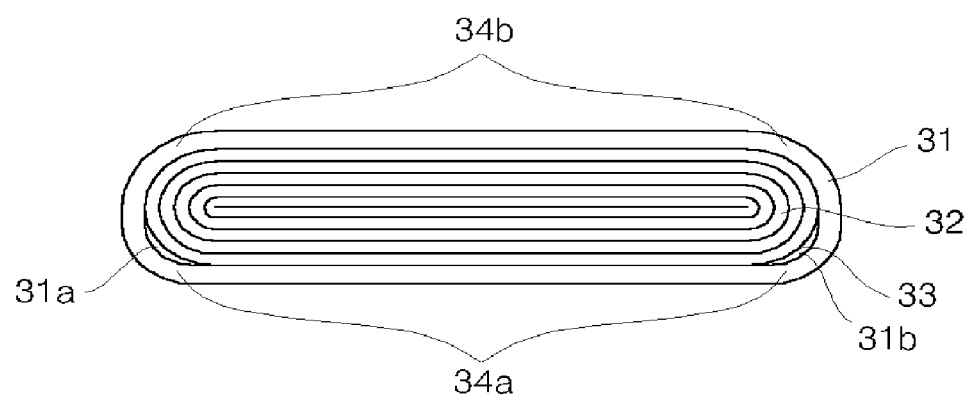
FIG. 4 is a top view of a lithium rechargeable battery according to a first embodiment of the present invention.

FIG. 3 is an exploded perspective view of a lithium rechargeable battery according to a first embodiment of the present invention. FIG. 4 is a top view of the lithium rechargeable battery according to a first embodiment of the present invention.

Referring to FIG. 3, the lithium rechargeable battery 30 includes a can 31, an electrode assembly 32 contained in the can 31, and a cap assembly 40 that is coupled with the top opening of the can 31.

One side of the can 31 and another side of the can 31 are asymmetrical to each other about at least one of the long axis, the short axis, and the central point of the cross section of the can 31. The cross section of the can 31 has four corner portions and at least one of the corner portions is curved. In addition, one of the corner portions of the can is curved with a curvature that is different from that of another. As shown in FIG. 3, a first corner portion 34a is asymmetrical to second corner portion 34b and has a curvature smaller than that of the latter. Consequently, the first corner portion 34a does not accurately correspond to the curved portion 33 of the electrode assembly 32 and a space 31a is formed between the first corner portion 34a and the curved portion 33 of the electrode assembly 32. Similarly, a space 31b may be formed between the second corner portion 34b and the curved portion of the electrode assembly 32.

The can 31 may comprise, but is not limited to iron, aluminum, or an aluminum alloy. When the can 31 is made of aluminum or an aluminum alloy, the battery may be lightweight due to the light weight of aluminum and it may not corrode even when used for a long time under high voltage.

The electrode assembly 32 is formed by winding a first electrode 35 and a second electrode 37 with a separator 36 interposed between them. The first electrode 35 is coupled with a cap plate 60 via a first electrode tab 38 and the second electrode 37 is coupled with a second electrode terminal 50 formed on the cap plate 60 via a second electrode tab 39. The first electrode 35 or second electrode 37 may act as a positive electrode or a negative electrode.

The cap assembly 40 is coupled with the top opening of the can 31 to seal it while being insulated from the electrode assembly 32 by a separate insulation case 90. The cap assembly 40 has a planar cap plate 60 that has a size and a shape corresponding to the top opening of the can 31. The cap plate 60 has a terminal through-hole 61 that is formed at its center to allow the second electrode terminal 50 to pass through.

The second electrode terminal 50 extends through the center of the cap plate 60 and has a tube-shaped gasket 35 that is positioned on its exterior to insulate the second electrode terminal 50 from the cap plate 60. An insulation plate 70 is positioned on the lower surface of the cap plate 60 near the terminal through-hole 61 of the cap plate 60. A terminal plate 80 is positioned on the lower surface of the insulation plate 70 while being coupled with the first electrode terminal 35.

The cap plate 60 may have a safety vent (not shown) that is formed thereon to discharge gas when the internal pressure rises and reaches a predetermined level. The cap plate 60 also has an electrolyte injection hole 62 that is formed on its side to provide a passage along which an electrolyte can be injected into the can 31. The electrolyte injection hole 62 is sealed by an electrolyte injection ball 63. The cap plate 60 may have a protective circuit module (not shown) that is positioned on its upper side to control the charging and discharging of the battery. The protective circuit module may be installed using a resin mold.

Referring to FIG. 4, a pair of second corner portions 34b of the can 31 that are positioned on one side of the long axis of the cross section of the can 31 have a curvature that is different from that of a pair of first corner portions 34a that are positioned on the other side thereof. As a result, predetermined spaces 31a and 31b may be formed between the curved portion 33 of the electrode assembly 32 and the first corner portions 34a. For example, the first corner portions 34a may have a curvature that is smaller than that of the second corner portions 34b and predetermined spaces 31a and 31b may be formed between the first corner portions 34a and the curved portion 33 of the electrode assembly 32.

With spaces 31 and 31b formed in this manner, an electrolyte (not shown) can be rapidly injected into the can 31. Furthermore, a sufficient amount of electrolyte may easily be injected into the electrode assembly 32 to be distributed between the electrodes in a uniform manner, thus increasing the battery's power storage capacity.

Figure 5:
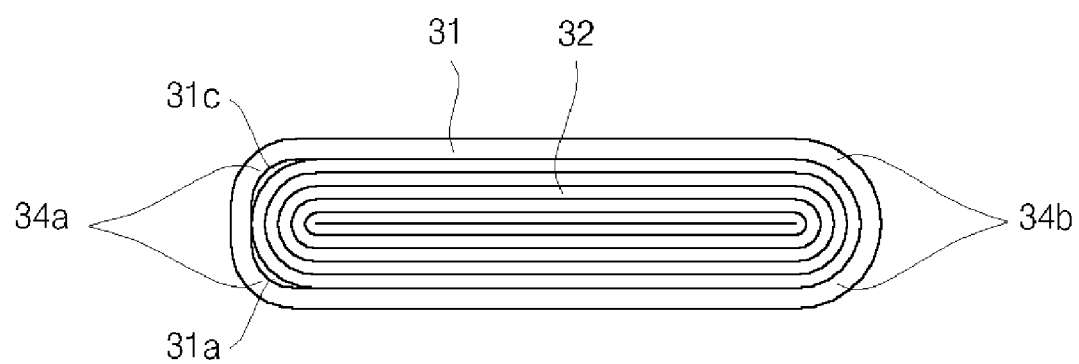
FIG. 5 is a top view of a lithium rechargeable battery according to a second embodiment of the present invention.

FIG. 5 is a top view of a lithium rechargeable battery according to a second embodiment of the present invention.

Referring to FIG. 5, a pair of second corner portions 34b of the can 31 that are positioned on one side of the short axis of the can 31 have a curvature that is different from a pair of first corner portions 34a that are positioned on the other side thereof. The first corner portions 34a have a curvature that is smaller than the curvatures of the second corner portions 34b. Thus predetermined spaces 31a and 31c may be formed between the first corner portions 34a and the curved portion 33 of the electrode assembly 32. Since the electrolyte is injected through the electrolyte injection hole 62, the first corner portions 34a are preferably positioned on a short edge on which the electrolyte injection hole 62 of the can 31 is formed. If the internal space of the can 31 formed by the first corner portions 34a are formed on a short edge opposite to the electrolyte injection hole 62, the electrolyte injection time may not be reduced as desired.

Figure 6:
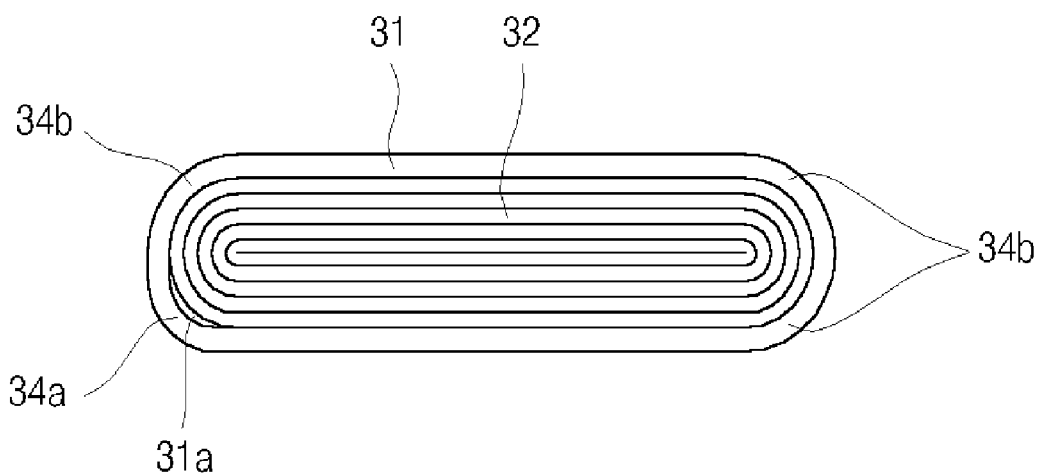
FIG. 6 is a top view of a lithium rechargeable battery according to a third embodiment of the present invention.

FIG. 6 is a top view of a lithium rechargeable battery according to a third embodiment of the present invention.

Referring to FIG. 6, a pair of corner portions of the can 31 that are positioned on a side of the central point of the cross section of the can 31 are asymmetrical to each other, while the other pair of corner portions positioned on the other side thereof are symmetrical to each other. A first corner portion 34a of the pair of corner portions which are asymmetrical to each other has a curvature that is smaller than that of the second corner portion 34b and is preferably positioned on a short edge on which the electrolyte injection hole 62 of the can 31 is formed. Since the electrolyte is injected through the electrolyte injection hole 62, the electrolyte injection time may not be reduced as desired if the internal space of the can 31 formed by the corner portion 34a is formed on a short edge opposite to the electrolyte injection hole 62.

Figure 7:
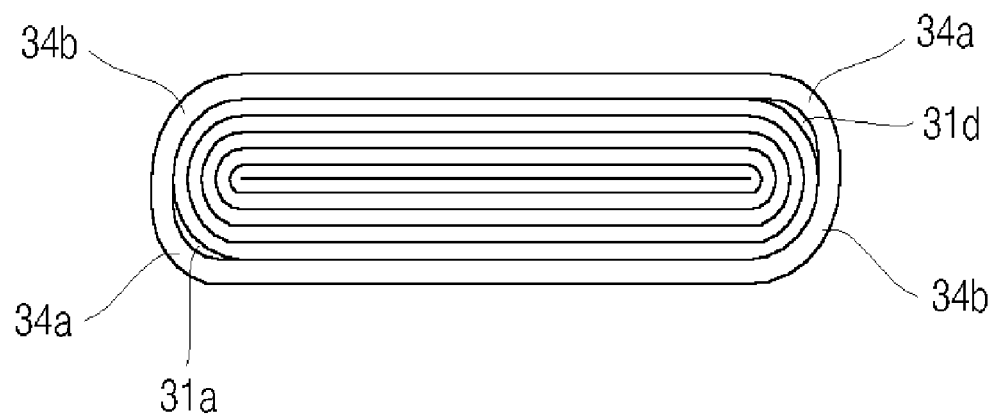
FIG. 7 is a top view of a lithium rechargeable battery according to a fourth embodiment of the present invention.
Figure 8:
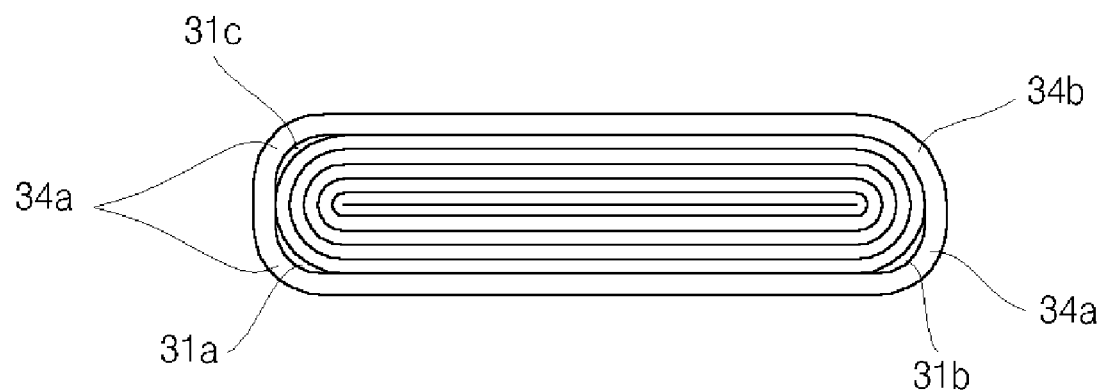
FIG. 8 is a top view of a lithium rechargeable battery according to a fifth embodiment of the present invention.

FIG. 7 is a top view of a lithium rechargeable battery according to a fourth embodiment of the present invention. FIG. 8 is a top view of a lithium rechargeable battery according to a fifth embodiment of the present invention.

Referring to FIG. 7, a pair of first corner portions 34a of the can 31 that are positioned diagonally from the central point of the cross section of the can 31 are symmetrical to each other and have a curvature that is smaller than that of the pair of second corner portions 34b. Thus, predetermined spaces 31a and 31d may be formed between the first corner portions 34a and the curved portion 33 of the electrode assembly 32. Alternatively, three first corner portions 34a may form a predetermined space with the curved portion 33 of the electrode assembly 32, as shown in FIG. 8. In that case, predetermined spaces 31a, 31b, and 31c may be formed between the first corner portions 34a and the curved portion 33 of the electrode assembly 32.

In addition, a pair of corner portions that are positioned diagonally about a central point may be right-angled, while the other pair of corner portions that are positioned diagonally about central point may be curved.

Figure 9:
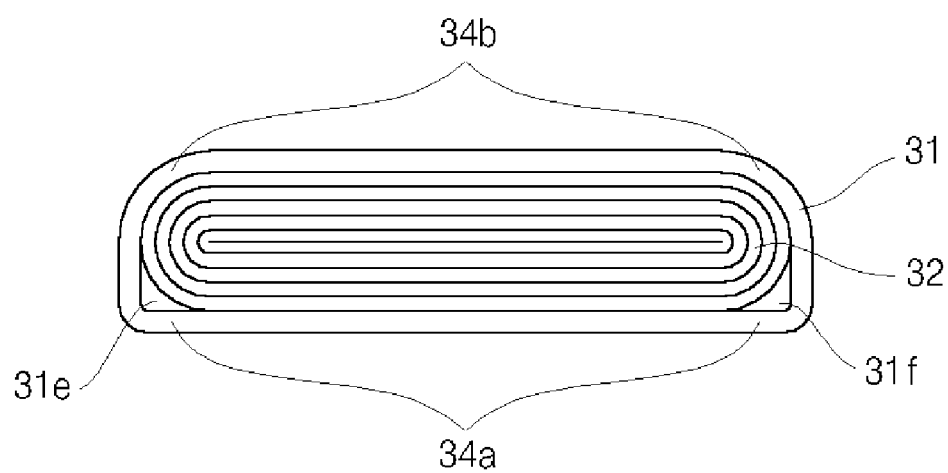
FIG. 9 is a top view of a lithium rechargeable battery according to a sixth embodiment of the present invention.
Figure 10:
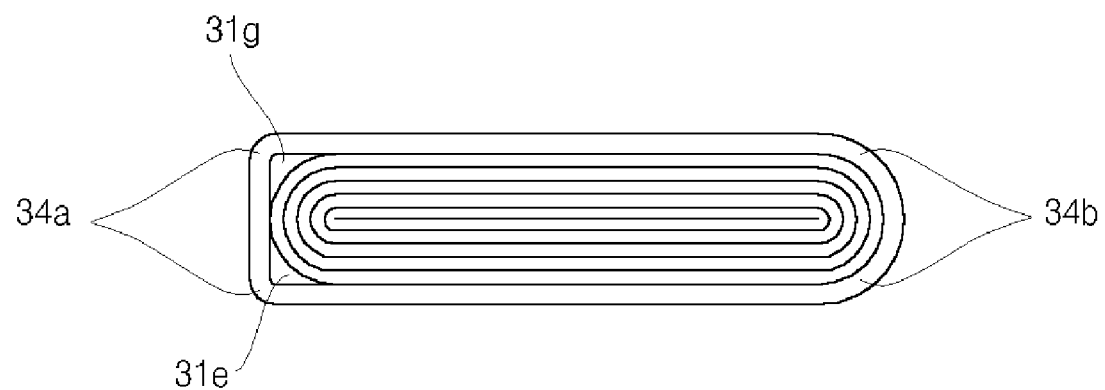
FIG. 10 is a top view of a lithium rechargeable battery according to a seventh embodiment of the present invention.
Figure 11:
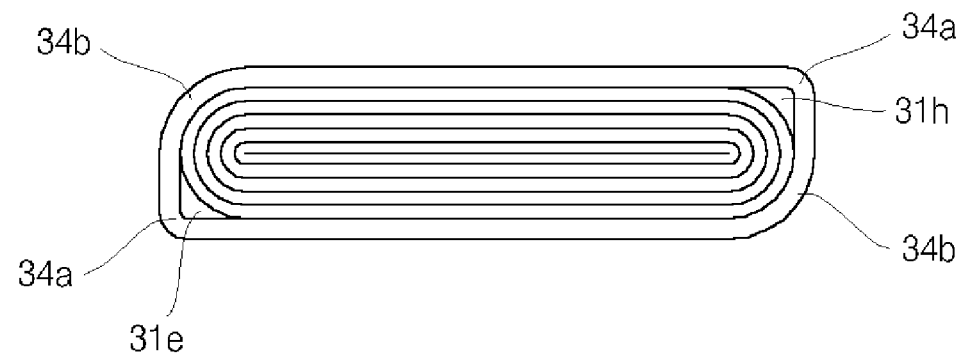
FIG. 11 is a top view of a lithium rechargeable battery according to an eighth embodiment of the present invention.

FIG. 9 is a top view of a lithium rechargeable battery according to a sixth embodiment of the present invention. FIG. 10 is a top view of a lithium rechargeable battery according to a seventh embodiment of the present invention. FIG. 11 is a top view of a lithium rechargeable battery according to an eighth embodiment of the present invention.

Referring to FIG. 9 and FIG. 10, the can 31 has curved second corner portions 34b and right-angled first corner portions 34a that are positioned on the long or short edge thereof. Thus, predetermined spaces 31e and 31f may be formed between the right-angled first corner portions 34a and the curved portion 33 of the electrode assembly 32 as shown in FIG. 9, and predetermined spaces 31e and 31g may be formed between the right-angled first corner portions 34a and the curved portion 33 of the electrode assembly 32 as shown in FIG. 10.

Referring to FIG. 11, the can 31 may have a pair of curved second corner portions 34b and a pair of right-angled first corner portions 34a. The curved second corner portions 34b are positioned diagonally from the central point of the cross section of the can 31. The right-angled first corner portions 34a are positioned diagonally from the central point of the cross section of the can 31. Thus, predetermined spaces 31e and 31h may be formed between the right-angled first corner portions 34a and the curved portion 33 of the electrode assembly 32 as shown in FIG. 9.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery, comprising:
   an electrode assembly comprising a first electrode, a second electrode, and a separator interposed between the first electrode and the second electrode;
   a can comprising an opening to contain the electrode assembly and comprising four curved corner portions; and
   a cap plate coupled to the can,
   wherein a side of the can is asymmetrical with respect to another side of the can about at least one of a long axis, short axis, and central point of a cross section facing the opening of the can,
   wherein only one of the four curved corner portions has a smaller curvature than the remaining three curved corner portions, and
   wherein the smaller curvature corner portion of the can is spaced apart from the first curved portion of the electrode assembly, and the remaining three curved corner portions of the can contact the second to fourth curved corner portions of the electrode assembly, respectively.

2. The battery of claim 1,
   wherein the can further comprises a first long side wall and a second long side wall;
   wherein first and second curved corner portions of the four curved corner portions are disposed adjacent to the first side wall; and
   wherein third and fourth curved corner portions of the four curved corner portions are disposed adjacent to the second side wall.

3. The battery of claim 2,
   wherein the electrode assembly further comprises:
   a first long side wall and a second long side wall corresponding to the first long side wall and the second long side wall of the can, respectively; and
   first to fourth curved corner portions corresponding to the first to fourth curved corner portions of the can, respectively.

4. The battery of claim 3,
   wherein the first curved corner portion of the can is spaced apart from the first curved corner portion of the electrode assembly, and
   wherein the second to fourth curved corner portions of the can contact the second to fourth curved corner portions of the electrode assembly, respectively.

5. The battery of claim 3,
   wherein the first long side wall and the second long side wall of the can contact the first long side wall and the second long side wall of the electrode assembly, respectively.

6. The battery of claim 1,
   wherein the cap plate further comprises an electrolyte injection hole, and
   wherein the electrolyte injection hole and the only one curved corner portion of the can having the smaller curvature are arranged on the same side of the short axis.

7. A battery, comprising:
   an electrode assembly comprising a first electrode, a second electrode, and a separator interposed between the first electrode and the second electrode;
   a can comprising an opening to contain the electrode assembly and comprising four curved corner portions; and
   a cap plate coupled to the can, wherein a side of the can is asymmetrical with respect to another side of the can about at least one of a long axis, short axis, and central point of a cross section facing the opening of the can, wherein only one of the four curved corner portions has a larger curvature than the remaining three curved corner portions, and wherein the larger curvature corner portion of the can contacts the first curved portion of the electrode assembly, and the remaining three curved corner portions of the can are spaced apart from the second to fourth curved corner portions of the electrode assembly, respectively.

8. The battery of claim 7, wherein the can further comprises a first long side wall and a second long side wall;

wherein first and second curved corner portions of the four curved corner portions are disposed adjacent to the first side wall; and wherein third and fourth curved corner portions of the four curved corner portions are disposed adjacent to the second side wall.

9. The battery of claim 8, wherein the electrode assembly further comprises:

a first long side wall and a second long side wall corresponding to the first long side wall and the second long side wall of the can, respectively; and first to fourth curved corner portions corresponding to the first to fourth curved corner portions of the can, respectively.

10. The battery of claim 9, wherein the first long side wall and the second long side wall of the can contact the first long side wall and the second long side wall of the electrode assembly, respectively.

* * * * *